US009191257B2

United States Patent
Tu et al.

(10) Patent No.: US 9,191,257 B2
(45) Date of Patent: Nov. 17, 2015

(54) METHOD FOR DETERMINING SIGNAL PHASE ROTATION OF SUB-CHANNELS WITHIN A TRANSMISSION BANDWIDTH

(75) Inventors: Yung Szu Tu, Hsinchu County (TW); Yen Chin Liao, Hsinchu County (TW); Cheng Hsuan Wu, Hsinchu County (TW)

(73) Assignee: MEDIATEK INC., Hsinchu (TW)

( * ) Notice: Subject to any disclaimer, the term of this patent is extended or adjusted under 35 U.S.C. 154(b) by 805 days.

(21) Appl. No.: 13/025,955

(22) Filed: Feb. 11, 2011

(65) Prior Publication Data

US 2011/0222612 A1   Sep. 15, 2011

Related U.S. Application Data

(60) Provisional application No. 61/313,836, filed on Mar. 15, 2010.

(51) Int. Cl.
*H04L 27/06* (2006.01)
*H04L 27/26* (2006.01)
*H04L 27/34* (2006.01)

(52) U.S. Cl.
CPC ........ *H04L 27/2621* (2013.01); *H04L 27/3411* (2013.01)

(58) Field of Classification Search
None
See application file for complete search history.

(56) References Cited

U.S. PATENT DOCUMENTS

| 6,366,626 | B1* | 4/2002 | Boyd | 375/343 |
| 7,324,605 | B2* | 1/2008 | Maltsev et al. | 375/299 |
| 2006/0193393 | A1* | 8/2006 | Shen et al. | 375/260 |
| 2009/0116545 | A1* | 5/2009 | Shearer et al. | 375/232 |
| 2011/0281534 | A1* | 11/2011 | Liao et al. | 455/127.1 |

\* cited by examiner

*Primary Examiner* — Shuwang Liu
*Assistant Examiner* — Gina McKie
(74) *Attorney, Agent, or Firm* — Hamre, Schumann, Mueller & Larson, P.C.

(57) ABSTRACT

A method for determining signal phase rotation of sub-channels within a contiguous transmission bandwidth comprises the steps of: determining a fundamental set of phase rotations; performing a cyclic shift operation for the fundamental set of phase rotations to generate a cyclic-shifted set of phase rotations; multiplying the cyclic-shifted set of phase rotations by a complex constant to generate a final set of phase rotations; and determining the phase rotation of each sub-channel within the contiguous transmission bandwidth according to the final set of phase rotations.

19 Claims, 7 Drawing Sheets

METHOD FOR DETERMINING SIGNAL PHASE ROTATION OF SUB-CHANNELS WITHIN A TRANSMISSION BANDWIDTH

BACKGROUND OF THE INVENTION

1. Field of the Invention

The present invention relates to a very high throughput transmission, and more particularly, to a very high throughput transmission with contiguous and non-contiguous channels.

2. Description of the Related Art

Wireless local area network (WLAN) technology is widely established to provide access to the Internet with mobile devices. Conventionally, a typical WLAN communication system may use a transmission bandwidth of 20 MHz or 40 MHz. To achieve a higher throughput in WLAN communication systems, greater transmission bandwidths are desired. A WLAN communication system with 80 MHz bandwidth has, therefore, become a target. However, as WLAN technology becomes more popular and widely accepted, the spectrum occupied by WLAN communication systems is becoming more crowded. Accordingly, a contiguous 80 MHz bandwidth is not always available. As a result, non-contiguous transmission has been proposed to increase the probability of transmitting data with wider bandwidth. In a WLAN communication system with non-contiguous transmission bandwidth, the sub-channels of the WLAN communication system are not necessarily adjacent.

A phase rotation technique is introduced in the IEEE standard 802.11n that uses a bandwidth of 40 MHz to overcome the peak-to-average-power-ratio (PAPR) problem. However, such phase rotation technique cannot be directly applied to WLAN communication systems using 80 MHz or greater bandwidth, including those with non-contiguous channels. Therefore, there is a need for a signal phase rotation method that can reduce the PAPR for both contiguous and non-contiguous channel configurations.

SUMMARY OF THE INVENTION

The method for determining signal phase rotation of sub-channels within a contiguous transmission bandwidth according to one embodiment of the present invention comprises the steps of: determining a fundamental set of phase rotations; performing a cyclic shift operation for the fundamental set of phase rotations to generate a cyclic-shifted set of phase rotations; multiplying the cyclic-shifted set of phase rotations by a complex constant to generate a final set of phase rotations; and determining the phase rotation of each sub-channel within the contiguous transmission bandwidth according to the final set of phase rotations.

The communication method for a communication system comprising four sub-channels within a contiguous transmission bandwidth according to one embodiment of the present invention comprises the steps of: performing phase rotation for each of the sub-channels, wherein three of the sub-channels have the same phase rotation, and the remaining sub-channel has a phase rotation with a 180-degree difference from that of the other three sub-channels.

The communication method for a communication system comprising four sub-channels within a contiguous transmission bandwidth according to another embodiment of the present invention comprises the steps of: performing phase rotation for each of the sub-channels, wherein two of the sub-channels have the same phase rotation, one of the remaining sub-channels has a phase rotation with a positive 90-degree difference from that of the first two sub-channels, and the other remaining sub-channel has a phase rotation with a negative 90-degree difference from that of the first two sub-channels.

The method for determining signal phase rotation of sub-channels within a contiguous transmission bandwidth according to another embodiment of the present invention comprises the steps of: determining a fundamental set of phase rotations; replacing one entry of the fundamental set of phase rotations with zero to generate a partially-used set of phase rotations; performing a cyclic shift operation for the partially-used set of phase rotations to generate a cyclic-shifted set of phase rotations; multiplying the cyclic-shifted set of phase rotations by a complex constant to generate a final set of phase rotations; and determining the phase rotation of each sub-channel within the contiguous transmission bandwidth according to the final set of phase rotations, wherein an entry of zero indicates an unused sub-channel.

The communication method for a communication system comprising four sub-channels within a contiguous transmission bandwidth according to yet another embodiment of the present invention comprises the steps of: performing phase rotation for each of the sub-channels, wherein one sub-channel is not used, two of the sub-channels have the same phase rotation, and the remaining sub-channel has a phase rotation with a 180-degree difference from that of the two sub-channels with the same phase rotation.

The communication method for a communication system comprising four sub-channels within a contiguous transmission bandwidth according to yet another embodiment of the present invention comprises the steps of: performing phase rotation for each of the sub-channels, wherein one sub-channel is not used, two of the sub-channels have the same phase rotation, and the remaining sub-channel has a phase rotation with a 90-degree difference from that of the two sub-channels with the same phase rotation.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes as those of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention will become apparent upon reading the following description and upon referring to the accompanying drawings of which.

DETAILED DESCRIPTION OF THE INVENTION

Figure 1:
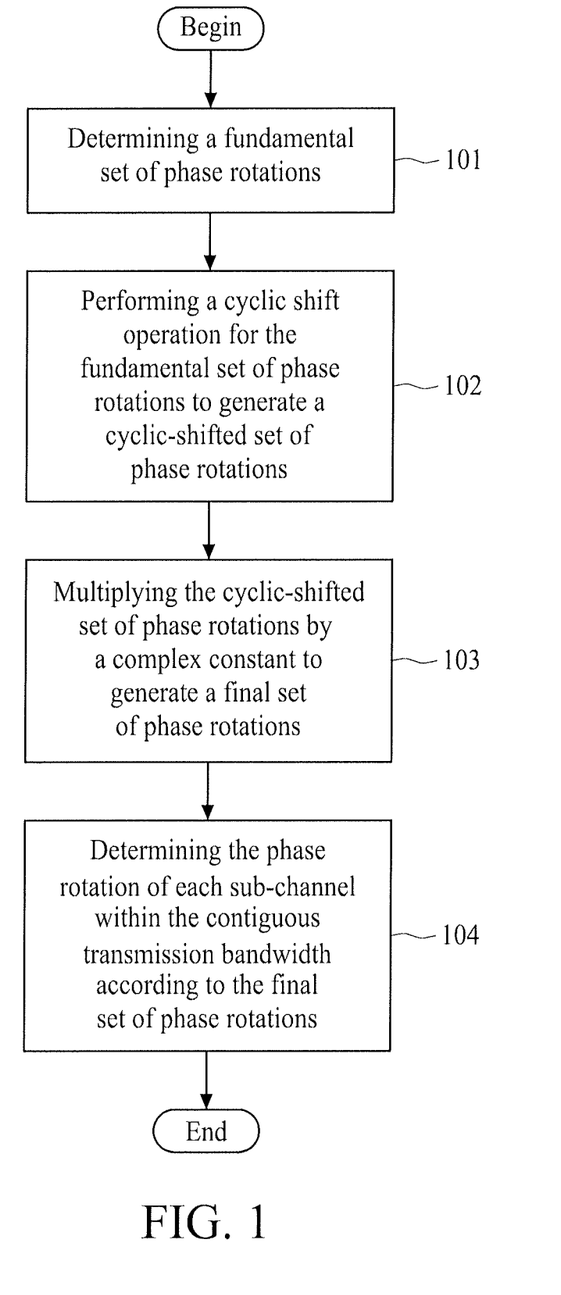
FIG. 1 shows the flowchart of a method for determining signal phase rotation of sub-channels within a contiguous transmission bandwidth according to an embodiment of the present invention.

FIG. 1 shows the flowchart of a method for determining signal phase rotation of sub-channels within a contiguous transmission bandwidth according to an embodiment of the present invention. In step 101, a fundamental set of phase rotations is determined, and step 102 is executed. In step 102, a cyclic shift operation for the fundamental set of phase rotations is performed to generate a cyclic-shifted set of phase rotations, and step 103 is executed. In step 103, the cyclic-shifted set of phase rotations is multiplied by a complex constant to generate a final set of phase rotations, and step 104 is executed. In step 104, the phase rotation of each sub-channel within the contiguous transmission bandwidth is determined according to the final set of phase rotations, and the current method is finished.

Figure 2:
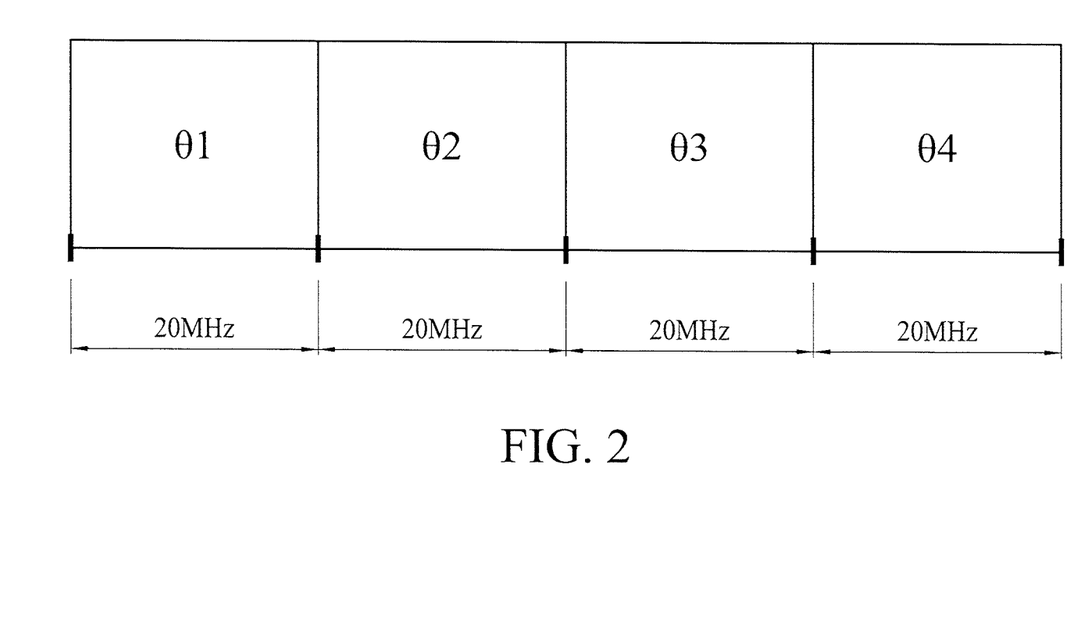
FIG. 2 shows a channel configuration of a WLAN communication system according to an embodiment of the present invention.

FIG. 2 shows a channel configuration of a WLAN communication system according to an embodiment of the present invention. As shown in FIG. 2, the WLAN communication system has a contiguous transmission bandwidth of 80 MHz divided into four sub-channels, wherein each sub-channel has a transmission bandwidth of 20 MHz. Accordingly, by applying phase rotation technique to the WLAN communication system, the first sub-channel is adjusted to a phase rotation of θ1, the second sub-channel is adjusted to a phase rotation of θ2, the third sub-channel is adjusted to a phase rotation of θ3 and the fourth sub-channel is adjusted to a phase rotation of θ4.

By applying the method shown in FIG. 1, one can determine the signal phase rotation of each sub-channel of the WLAN communication system. In step 101, a fundamental set of phase rotations is determined. In this embodiment, a fundamental set of [1, 1, 1, −1] is determined, wherein 1 represents a phase rotation of zero degrees and −1 represents a phase rotation of 180 degrees. In step 102, a cyclic shift operation for the fundamental set of phase rotations [1, 1, 1, −1] is performed. Accordingly, by applying different cyclic shift values, such as zero, one, two or three, the cyclic-shifted set of phase rotations can be [1, 1, 1, −1], [1, 1, −1, 1], [1, −1, 1, 1] or [−1, 1, 1, 1]. In step 103, the cyclic-shifted set of phase rotations is multiplied by a complex constant, such as 1, −1, j or −j, wherein 1 represents a phase rotation of zero degrees, −1 represents a phase rotation of 180 degrees, j represents a phase rotation of 90 degrees and −j represents a phase rotation of 270 degrees. In this embodiment, for simplicity, the first entry of the cyclic-shifted set is denoted by 1. Accordingly, in step 103, the cyclic-shifted set of phase rotations [1, 1, 1, −1] is multiplied by 1, [1, 1, −1, 1] is multiplied by 1, [1, −1, 1, 1] is multiplied by 1, and [−1, 1, 1, 1] is multiplied by −1. As a result, the possible final set of phase rotations are as follows: [1, 1, 1, −1], [1, 1, −1, 1], [1, −1, 1, 1] and [1, −1, −1, −1]. In step 104, the signal phase rotation of the WLAN communication system shown in FIG. 2 can be determined according to the final set of phase rotations. That is, for the first set of the final set of phase rotations [1, 1, 1, −1], θ1 is zero degrees, θ2 is zero degrees, θ3 is zero degrees, and θ4 is 180 degrees.

As can be seen from the above embodiment, an observation of the possible final set of phase rotations deduced from the fundamental set of [1, 1, 1, −1] shows that regardless of the cyclic shift value and the complex constant, three of the sub-channels have the same phase rotation, and the remaining sub-channel has a phase rotation with a 180-degree difference from that of the other three sub-channels.

In another embodiment of the present invention, in step 101, a fundamental set of [1, j, 1, −j] is determined, wherein 1 represents a phase rotation of zero degrees, −1 represents a phase rotation of 180 degrees, j represents a phase rotation of 90 degrees and −j represents a phase rotation of 270 degrees. In step 102, a cyclic shift operation for the fundamental set of phase rotations [1, j, 1, −j] is performed. Accordingly, by applying different cyclic shift values, such as zero, one, two or three, the cyclic-shifted set of phase rotations can be [1, j, 1, −j], [j, 1, −j, 1], [1, −j, 1, j] or [−j, 1, j, 1]. In step 103, the cyclic-shifted set of phase rotations is multiplied by a complex constant, such as 1, −1, j or −j, wherein 1 represents a phase rotation of zero degrees, −1 represents a phase rotation of 180 degrees, j represents a phase rotation of 90 degrees and −j represents a phase rotation of 270 degrees. In this embodiment, for simplicity, the first entry of the cyclic-shifted set is denoted by 1. Accordingly, in step 103, the cyclic-shifted set of phase rotations [1, j, 1, −j] is multiplied by 1, [j, 1, −j, 1] is multiplied by −j, [1, −j, 1, j] is multiplied by 1, and [−j, 1, j, 1] is multiplied by j. As a result, the possible final sets of phase rotations are [1, j, 1, −j], [1, −j, −1, −j], [1, −j, 1, j] and [1, j, −1, j]. In step 104, the signal phase rotation of the WLAN communication system shown in FIG. 2 can be determined according to the final set of phase rotations. That is, for the final set of phase rotations [1, j, 1, −j], θ1 is zero degrees, θ2 is 90 degrees, θ3 is zero degrees, and θ4 is 270 degrees.

As can be seen from the above embodiment, an observation of the possible final set of phase rotations deduced from the fundamental set of [1, j, 1, −j] shows that regardless of the cyclic shift value and the complex constant, two of the sub-channels have the same phase rotation, one of the remaining sub-channels has a phase rotation with a positive 90-degree difference from that of the two sub-channels with the same phase rotation, and the other remaining sub-channel has a phase rotation with a negative 90-degree difference from that of the two sub-channels with the same phase rotation.

As stated above, as WLAN technology becomes more popular and widely accepted, the spectrum occupied by WLAN communication systems becomes more crowded. Accordingly, a contiguous bandwidth is not always available.

Figure 3:
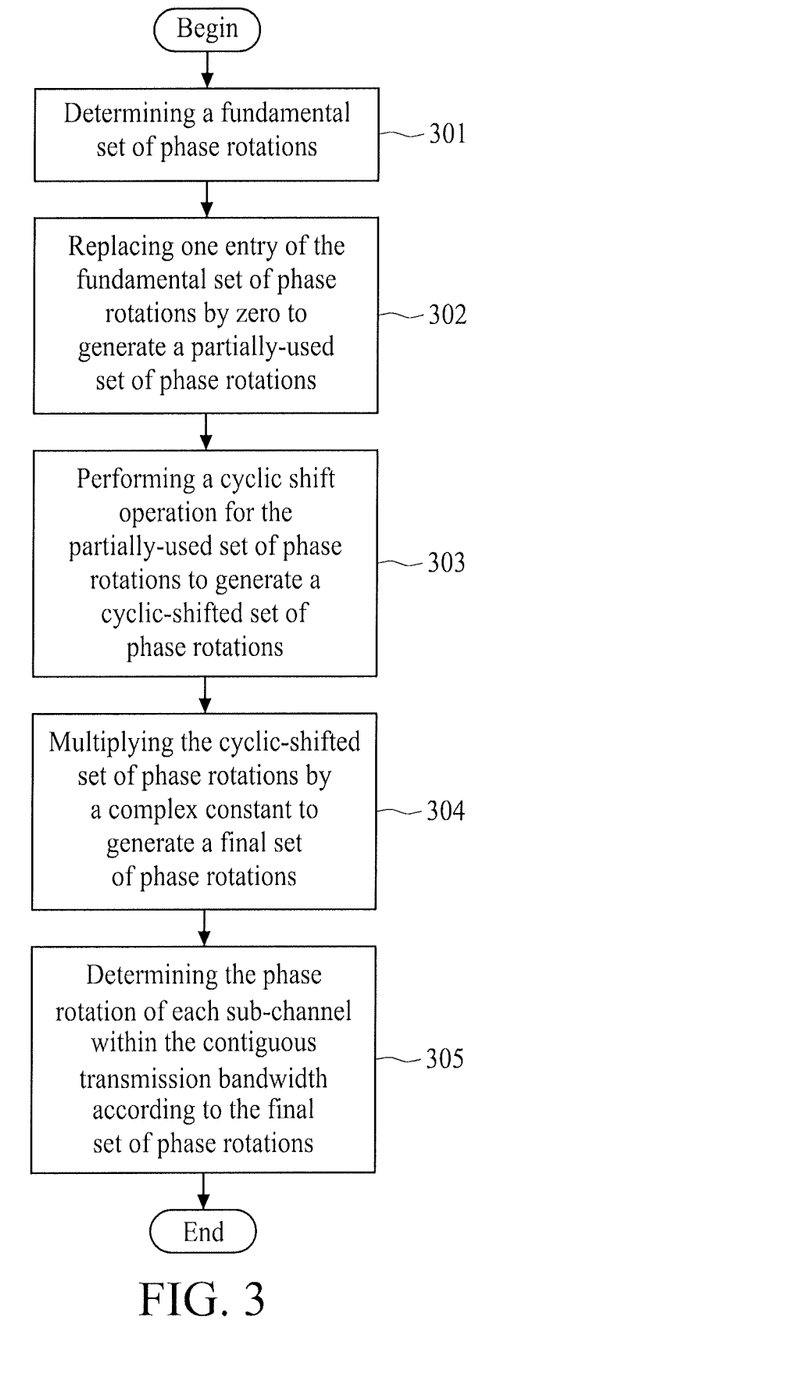
FIG. 3 shows the flowchart of a method for determining signal phase rotation of sub-channels within a contiguous transmission bandwidth according to another embodiment of the present invention.

FIG. 3 shows the flowchart of a method for determining signal phase rotation of sub-channels within a contiguous transmission bandwidth according to another embodiment of the present invention. In step 301, a fundamental set of phase rotations is determined, and step 302 is executed. In step 302, one entry of the fundamental set of phase rotations is replaced by zero to generate a partially-used set of phase rotations and step 303 is executed. In step 303, a cyclic shift operation for the partially-used set of phase rotations is performed to generate a cyclic-shifted set of phase rotations, and step 304 is executed. In step 304, the cyclic-shifted set of phase rotations is multiplied by a complex constant to generate a final set of phase rotations, and step 305 is executed. In step 305, the phase rotation of each sub-channel within the contiguous transmission bandwidth is determined according to the final set of phase rotations, and the current method is finished.

FIGS. 4 to 7 show different channel configurations of a WLAN communication system according to embodiments of the present invention. As shown in FIGS. 4 to 7, the WLAN communication system has a contiguous transmission bandwidth of 80 MHz divided into four sub-channels, wherein each sub-channel has a transmission bandwidth of 20 MHz. In addition, each channel configuration has an unused sub-channel, wherein in FIGS. 5 and 6, such channel configurations result in non-contiguous transmission bandwidth. By applying phase rotation technique to the different channel configurations of the WLAN communication system shown in FIGS. 4 to 7, the first used sub-channel is adjusted to a phase rotation of θ1, the second used sub-channel is adjusted to a phase rotation of θ2 and the third used sub-channel is adjusted to a phase rotation of θ3.

Figure 4:
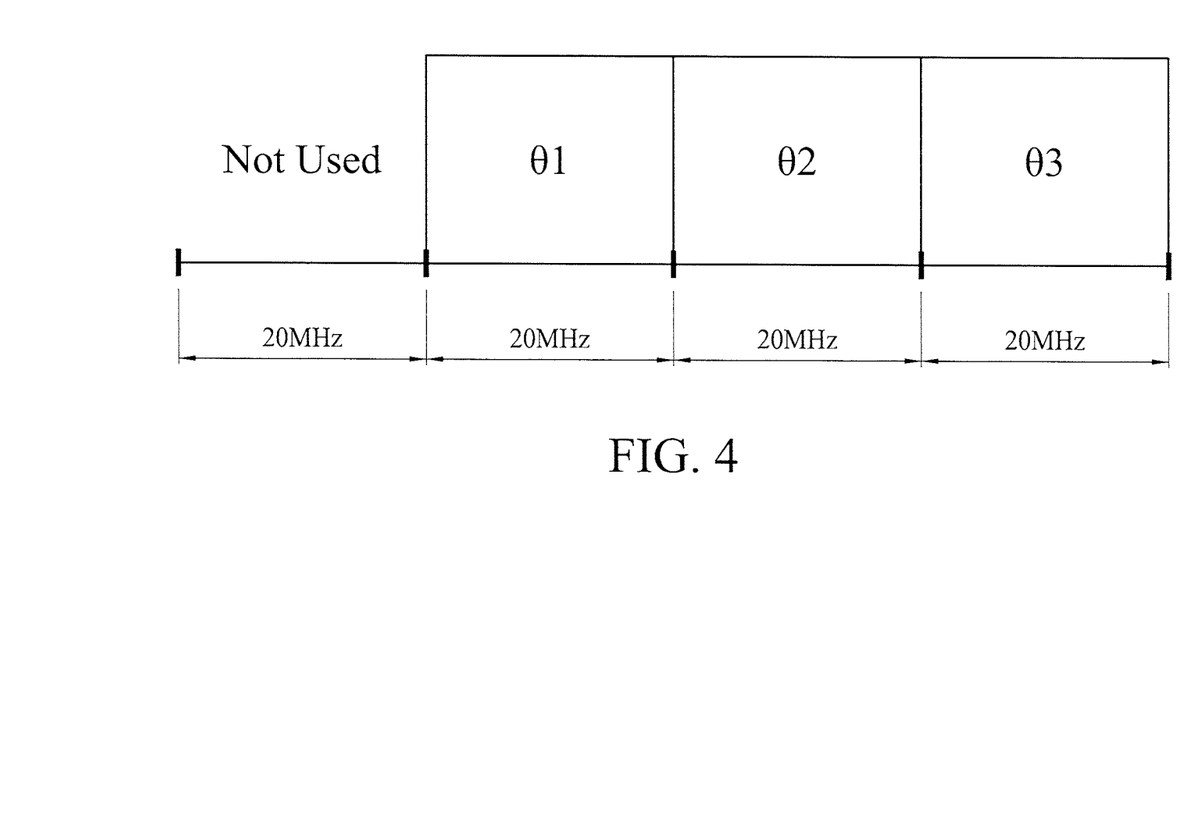
FIG. 4 shows a channel configuration of a WLAN communication system according to another embodiment of the present invention.

By applying the method shown in FIG. 3, one can determine the signal phase rotation of each sub-channel of the WLAN communication system. In step 301, a fundamental set of phase rotations is determined. In this embodiment, a fundamental set of [1, 1, 1, −1] is determined, wherein 1 represents a phase rotation of zero degrees and −1 represents a phase rotation of 180 degrees. In step 302, one entry of the fundamental set of phase rotations is replaced by zero. In this embodiment, the replacement step is performed to replace the beginning or the end entry of successive entries of identical values with zeros. Accordingly, either the first or the third entry is replaced by zero. As a result, the generated partially-used set of phase rotations is [0, 1, 1, −1] or [1, 1, 0, −1]. In step 303, a cyclic shift operation for the partially-used set of phase rotations [0, 1, 1, −1] or [1, 1, 0, −1] is performed. Accordingly, by applying different cyclic shift values, such as zero, one, two or three, the cyclic-shifted set of phase rotations for the partially-used set of phase rotations [0, 1, 1, −1] can be [0, 1, 1, −1], [1, 1, −1, 0], [1, −1, 0, 1] or [−1, 0, 1, 1], and the cyclic-shifted set of phase rotations for the partially-used set of phase rotations [1, 1, 0, −1] can be [1, 1, 0, −1], [1, 0 −1, 1], [0, −1, 1, 1] or [−1, 1, 1, 0]. The cyclic-shifted sets of phase rotations [0, 1, 1, −1] and [0, −1, 1, 1] correspond to the channel configuration shown in FIG. 4. The cyclic-shifted sets of phase rotations [−1, 0, 1, 1] and [1, 0 −1, 1] correspond to the channel configuration shown in FIG. 5. The cyclic-shifted sets of phase rotations [1, −1, 0, 1] and [1, 1, 0, −1] correspond to the channel configuration shown in FIG. 6. The cyclic-shifted sets of phase rotations [1, 1, −1, 0] and [−1, 1, 1, 0] correspond to the channel configuration shown in FIG. 7. In step 304, the cyclic-shifted set of phase rotations is multiplied by a complex constant, such as 1, −1, j or −j, wherein 1 represents a phase rotation of zero degrees, −1 represents a phase rotation of 180 degrees, j represents a phase rotation of 90 degrees and −j represents a phase rotation of 270 degrees. In this embodiment, for simplicity, the first non-zero entry of the cyclic-shifted set is denoted by 1. Accordingly, in step 304, for the channel configuration shown in FIG. 4, the cyclic-shifted set of phase rotations [0, 1, 1, −1] is multiplied by 1, and the cyclic-shifted set of phase rotations [0, −1, 1, 1] is multiplied by −1. As a result, the possible final sets of phase rotations for the channel configuration shown in FIG. 4 are [0, 1, 1, −1] and [0, 1, −1, −1]. That is, for the final set of phase rotations [0, 1, 1, −1], θ1 is zero degrees, θ2 is zero degrees and θ3 is 180 degrees.

Figure 5:
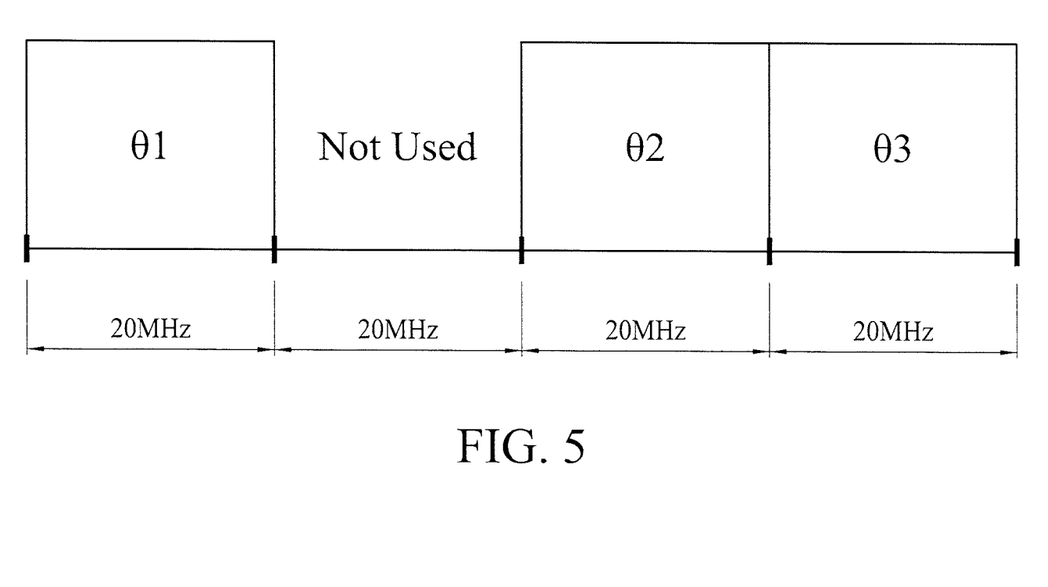
FIG. 5 shows a channel configuration of a WLAN communication system according to yet another embodiment of the present invention.
Figure 6:
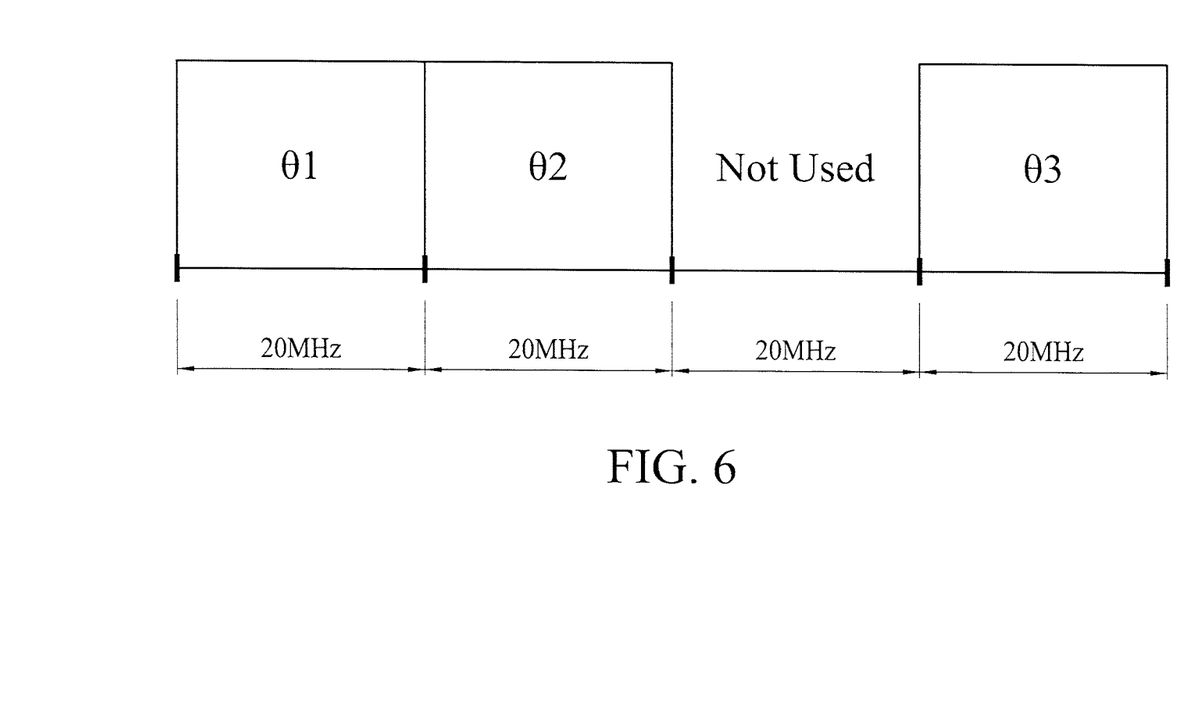
FIG. 6 shows a channel configuration of a WLAN communication system according to yet another embodiment of the present invention.
Figure 7:
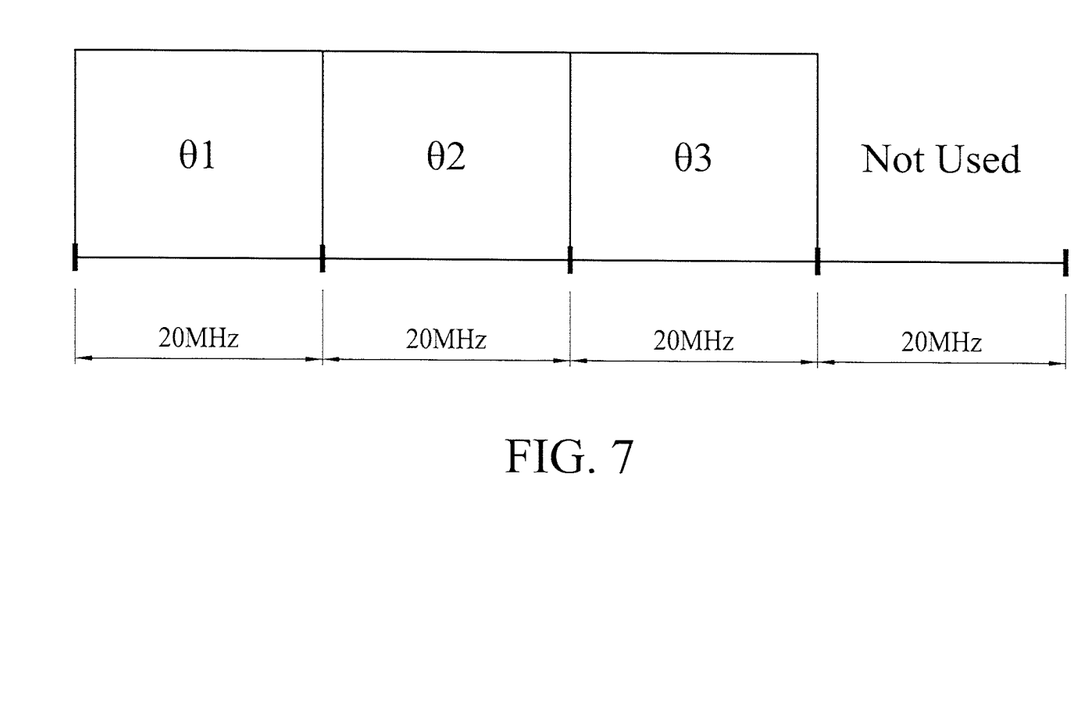
FIG. 7 shows a channel configuration of a WLAN communication system according to yet another embodiment of the present invention.

For simplicity, the calculations of step 304 for the channel configuration shown in FIGS. 5 to 7 are not shown. The possible final sets of phase rotations for the channel configuration shown in FIG. 5 are as follows: [1, 0, −1, −1] and [1, 0, −1, 1]. The possible final sets of phase rotations for the channel configuration shown in FIG. 6 are [1, −1, 0, 1] and [1, 1, 0, −1]. The possible final sets of phase rotations for the channel configuration shown in FIG. 7 are [1, 1, −1, 0] and [1, −1, −1, 0].

As can be seen from the above embodiment, an observation of the possible final sets of phase rotations deduced from the fundamental set of [1, 1, 1, −1] shows that regardless of the cyclic shift value and the complex constant, one sub-channel is not used, two of the sub-channels have the same phase rotation, and the remaining sub-channel has a phase rotation with a 180-degree difference from that of the two sub-channels with the same phase rotation.

In another embodiment of the present invention, in step 301, a fundamental set of [1, j, 1, −j] is determined, wherein 1 represents a phase rotation of zero degrees, −1 represents a phase rotation of 180 degrees, j represents a phase rotation of 90 degrees and −j represents a phase rotation of 270 degrees. In step 302, one entry of the fundamental set of phase rotations is replaced by zero. In this embodiment, the replacement step is performed to replace a non-duplicated entry by zero. Accordingly, either the second or the fourth entry is replaced by zero. As a result, the generated partially-used set of phase rotations is either [1, 0, 1, −j] or [1, j, 1, 0]. In step 303, a cyclic shift operation for the partially-used set of phase rotations [1, 0, 1, −j] or [1, j, 1, 0] is performed. Accordingly, by applying different cyclic shift values, such as zero, one, two or three, the cyclic-shifted set of phase rotations for the partially-used set of phase rotations [1, 0, 1, −j] can be [1, 0, 1, −j], [0, 1, −j, 1], [1, −j, 1, 0] or [−j, 1, 0, 1], and the cyclic-shifted set of phase rotations for the partially-used set of phase rotations [1, j, 1, 0] can be [1, j, 1, 0], [j, 1, 0, 1], [1, 0, 1, j] or [0, 1, j, 1]. The cyclic-shifted sets of phase rotations [0, 1, −j, 1] and [0, 1, j, 1] correspond to the channel configuration shown in FIG. 4. The cyclic-shifted sets of phase rotations [1, 0, 1, −j] and 1, 0, 1, j] correspond to the channel configuration shown in FIG. 5. The cyclic-shifted sets of phase rotations [−j, 1, 0, 1] and [j, 1, 0, 1] correspond to the channel configuration shown in FIG. 6. The cyclic-shifted sets of phase rotations [1, −j, 1, 0] and [1, j, 1, 0] correspond to the channel configuration shown in FIG. 7. In step 304, the cyclic-shifted set of phase rotations is multiplied by a complex constant, such as 1, −1, j or −j, wherein 1 represents a phase rotation of zero degrees, −1 represents a phase rotation of 180 degrees, j represents a phase rotation of 90 degrees and −j represents a phase rotation of 270 degrees. In this embodiment, for simplicity, the first non-zero entry of the cyclic-shifted set is denoted by 1. Accordingly, in step 304, for the channel configuration shown in FIG. 4, the cyclic-shifted set of phase rotations [0, 1, −j, 1] is multiplied by 1, and the cyclic-shifted sets of phase rotations [0, 1, j, 1] is also multiplied by 1. As a result, the possible final sets of phase rotations for the channel configuration shown in FIG. 4 are [0, 1, −j, 1] and [0, 1, j, 1]. That is, for the first set of the final set of phase rotations [0, 1, −j, 1], θ1 is zero degrees, θ2 is 90 degrees and θ3 is zero degrees.

For simplicity, the calculations of step 304 for the channel configuration shown in FIGS. 5 to 7 are not shown. The possible final sets of phase rotations for the channel configuration shown in FIG. 5 are [1, 0, 1, −j] and 1, 0, 1, j]. The possible final sets of phase rotations for the channel configuration shown in FIG. 6 are [1, j, 0, j] and [1, −j, 0, −j]. The possible final sets of phase rotations for the channel configuration shown in FIG. 7 are [1, −j, 1, 0] and [1, j, 1, 0].

As can be seen from the above embodiment, an observation of the possible final sets of phase rotations deduced from the fundamental set of [1, j, 1, −j] shows that regardless of the cyclic shift value and the complex constant, one sub-channel is not used, two of the sub-channels have the same phase rotation, and the remaining sub-channel has a phase rotation with a 90-degree difference from that of the two sub-channels with the same phase rotation, wherein in some embodiments of the present invention, the remaining sub-channel has a phase rotation with a positive 90-degree difference from that of the two sub-channels with the same phase rotation; in some embodiments of the present invention, the remaining sub-channel has a phase rotation with a negative 90-degree difference from that of the two sub-channels with the same phase rotation.

When the present invention is implemented in a WLAN communication system, such as one complying with IEEE standard 802.11n, since the signals of all sub-channels have the same frequency domain in some fields, such as legacy short training field (L-STF) and legacy long training field (L-LTF) except the frequency shift, the multiplication to a signal in a sub-channel by 1, j, −1 or −j can be implemented merely by copying another signal from other sub-channels, to swap the real and the imaginary components of the signal, and/or to perform the operation of the 1's/2's) compliment of the signal. The operation of each sub-channel can be also implemented in time domain and the signals from each sub-channel can then be summed up.

In conclusion, the present invention provides methods for determining signal phase rotation of sub-channels that can be applied to a contiguous transmission bandwidth or a non-contiguous transmission bandwidth. Further, the present invention also provides communication methods that utilize phase rotation technique that can reduce PAPR problems and can be used in a communication system with 80 MHz or greater transmission bandwidth.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining signal phase rotation of sub-channels within a non-contiguous transmission bandwidth, the method comprising the steps of:
    determining a fundamental set of phase rotations;
    performing a cyclic shift operation for all of the fundamental set of phase rotations to generate a cyclic-shifted set of phase rotations;
    multiplying the cyclic-shifted set of phase rotations by a complex constant to generate a final set of phase rotations; and
    determining the phase rotation of each sub-channel within the non-contiguous transmission bandwidth within a communication system according to the final set of phase rotations,
    wherein the sub-channels comprise four sub-channels within the non-contiguous transmission bandwidth, and three of the four sub-channels have the same phase rotation, and the remaining sub-channel has a phase rotation with a 180-degree difference from that of the other three sub-channels.

2. The method of claim 1, wherein the fundamental set is [1, 1, 1, −1], wherein 1 represents a phase rotation of zero degrees and −1 represents a phase rotation of 180 degrees.

3. The method of claim 1, wherein the fundamental set is [1, j, 1, −j], wherein 1 represents a phase rotation of zero degrees, −1 represents a phase rotation of 180 degrees, j represents a phase rotation of 90 degrees and −j represents a phase rotation of 270 degrees.

4. The method of claim 1, wherein the complex constant is 1, −1, j or −j, wherein 1 represents a phase rotation of zero degrees, −1 represents a phase rotation of 180 degrees, j represents a phase rotation of 90 degrees and −j represents a phase rotation of 270 degrees.

5. The method of claim 1, wherein a cyclic shift value applied for the cyclic shift operation is zero, one, two or three.

6. The method of claim 1, wherein the transmission bandwidth is 80 MHz, and each sub-channel has a bandwidth of 20 MHz.

7. A method for determining signal phase rotation of sub-channels within a non-contiguous transmission bandwidth, the method comprising the steps of:
    determining a fundamental set of phase rotations;
    performing a cyclic shift operation for all of the fundamental set of phase rotations to generate a cyclic-shifted set of phase rotations;
    multiplying the cyclic-shifted set of phase rotations by a complex constant to generate a final set of phase rotations; and
    determining the phase rotation of each sub-channel within the non-contiguous transmission bandwidth within a communication system according to the final set of phase rotations,
    wherein the sub-channels comprise four sub-channels within the non-contiguous transmission bandwidth, and two of the sub-channels have the same phase rotation, one of the remaining sub-channels has a phase rotation with a positive 90-degree difference from that of the two sub-channels with the same phase rotation, and the other remaining sub-channel has a phase rotation with a negative 90-degree difference from that of the two sub-channels with the same phase rotation.

8. A method for determining signal phase rotation of sub-channels within a non-contiguous transmission bandwidth, the method comprising the steps of:
    determining a fundamental set of phase rotations;
    replacing a beginning entry or an end entry of successive entries of identical value with zeros to generate a partially-used set of phase rotations and the non-contiguous transmission bandwidth;
    performing a cyclic shift operation for all of the partially-used set of phase rotations to generate a cyclic-shifted set of phase rotations;
    multiplying the cyclic-shifted set of phase rotations by a complex constant to generate a final set of phase rotations; and
    determining the phase rotation of each sub-channel within the non-contiguous transmission bandwidth within a communication system according to the final set of phase rotations, wherein an entry of zero indicates an unused sub-channel,
    wherein the sub-channels comprise four sub-channels within the non-contiguous transmission bandwidth, and one sub-channel is not used, two of the sub-channels have the same phase rotation, and the remaining sub-channel has a phase rotation with a 180-degree difference from that of the two sub-channels with the same phase rotation.

9. The method of claim 8, wherein the replacing step is performed to replace the first or the third entry with zero.

10. The method of claim 8, wherein the replacing step is performed to replace a non-duplicated entry with zero.

11. The method of claim 10, wherein the replacing step is performed to replace the second or the fourth entry with zero.

12. The method of claim 8, wherein the fundamental set is [1, 1, 1, −1], wherein 1 represents a phase rotation of zero degrees and −1 represents a phase rotation of 180 degrees.

13. The method of claim 8, wherein the fundamental set is [1, j, 1, −j], wherein 1 represents a phase rotation of zero degrees, −1 represents a phase rotation of 180 degrees, j represents a phase rotation of 90 degrees and −j represents a phase rotation of 270 degrees.

14. The method of claim 8, wherein the complex constant is 1, −1, j or −j, wherein 1 represents a phase rotation of zero degrees, −1 represents a phase rotation of 180 degrees, j represents a phase rotation of 90 degrees and −j represents a phase rotation of 270 degrees.

15. The method of claim 8, wherein a cyclic shift value applied for the cyclic shift operation is zero, one, two or three.

16. The method of claim 8, wherein the transmission bandwidth is 80 MHz, and each sub-channel has a bandwidth of 20 MHz.

17. A method for determining signal phase rotation of sub-channels within a non-contiguous transmission bandwidth, the method comprising the steps of:

determining a fundamental set of phase rotations;
replacing a beginning entry or an end entry of successive entries of identical value with zeros to generate a partially-used set of phase rotations and the non-contiguous transmission bandwidth;
performing a cyclic shift operation for all of the partially-used set of phase rotations to generate a cyclic-shifted set of phase rotations;
multiplying the cyclic-shifted set of phase rotations by a complex constant to generate a final set of phase rotations; and
determining the phase rotation of each sub-channel within the non-contiguous transmission bandwidth within a communication system according to the final set of phase rotations, wherein an entry of zero indicates an unused sub-channel,
    wherein the sub-channels comprise four sub-channels within the non-contiguous transmission bandwidth, and one sub-channel is not used, two of the sub-channels have the same phase rotation, and the remaining sub-channel has a phase rotation that is different from that of the two sub-channels with the same phase rotation.

18. The method of claim 17, wherein the remaining sub-channel has a phase rotation with a positive 90-degree difference from that of the two sub-channels with the same phase rotation.

19. The method of claim 17, wherein the remaining sub-channel has a phase rotation with a negative 90-degree difference from that of the two sub-channels with the same phase rotation.

* * * * *